Dec. 31, 1929.                S. HALVORSEN                1,741,564
             SIGNALING, INDICATING, STOPPING, AND STARTING DEVICE
                   Original Filed May 20, 1922    12 Sheets-Sheet 1

Witness

Inventor:
Severin Halvorsen.
By A. Miller Belfield
                Atty

Dec. 31, 1929.　　　　S. HALVORSEN　　　　1,741,564
SIGNALING, INDICATING, STOPPING, AND STARTING DEVICE
Original Filed May 20, 1922　　12 Sheets-Sheet 2

Witness

Inventor:
Severin Halvorsen
By S. Miller Belfield
Atty

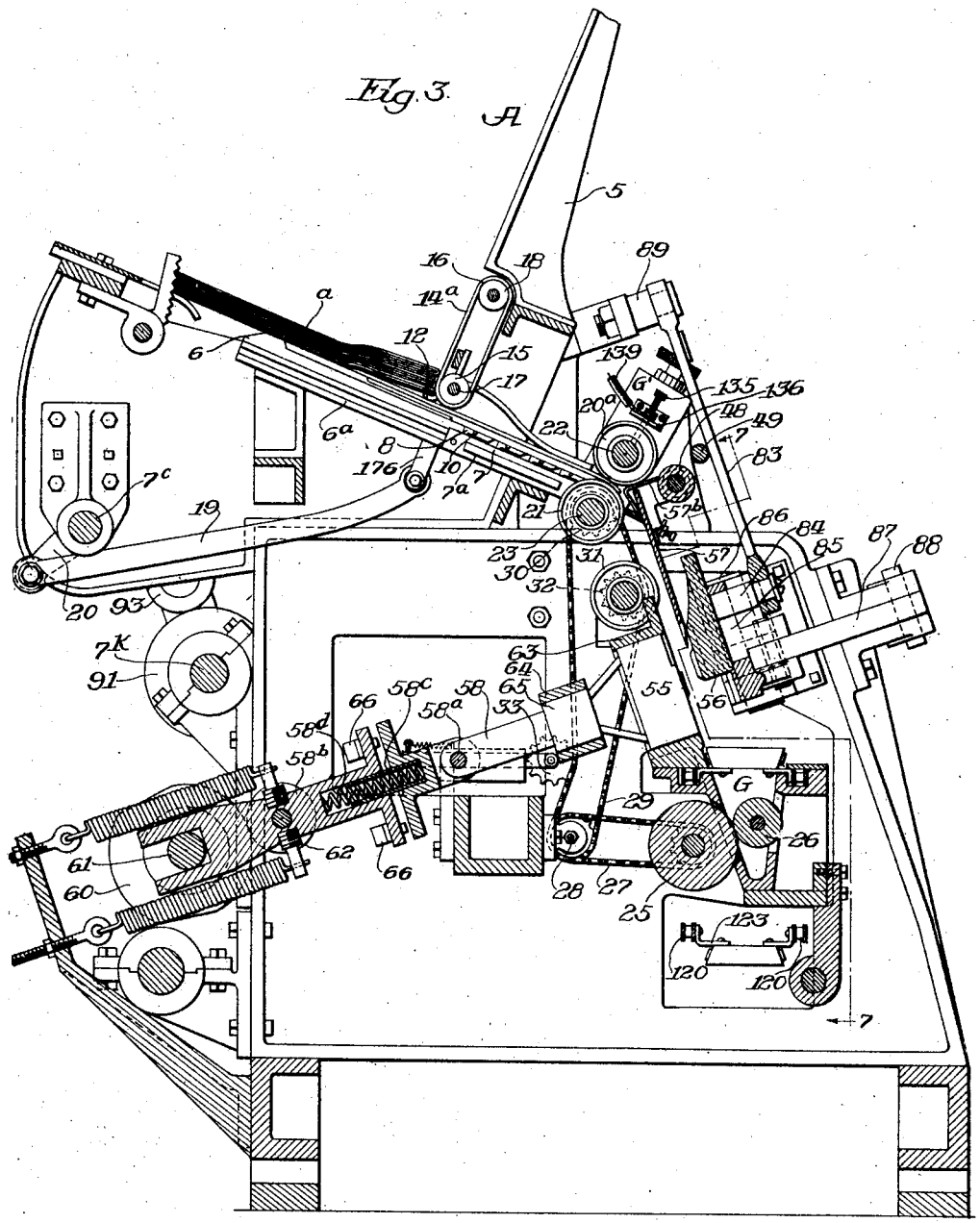

Dec. 31, 1929.   S. HALVORSEN   1,741,564
SIGNALING, INDICATING, STOPPING, AND STARTING DEVICE
Original Filed May 20, 1922    12 Sheets-Sheet 4

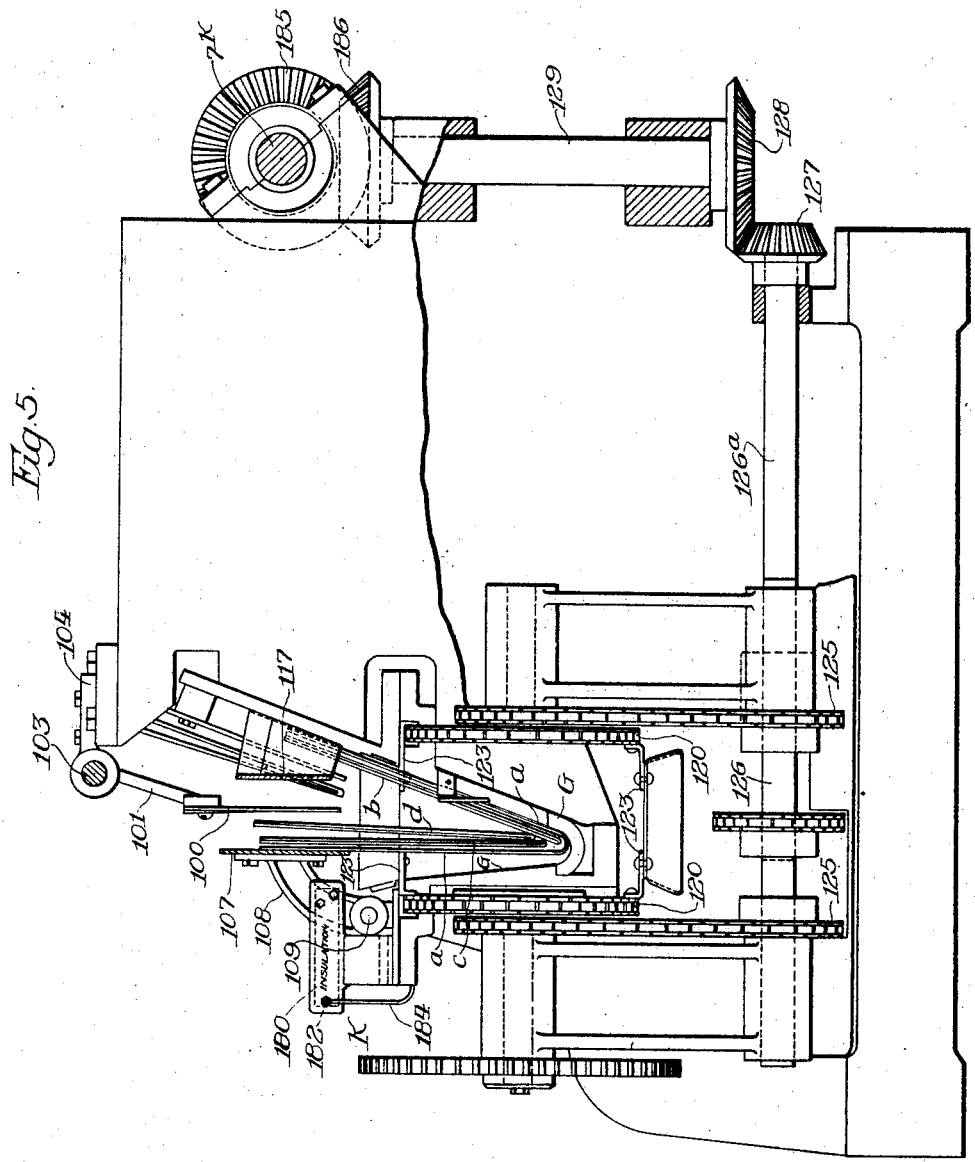

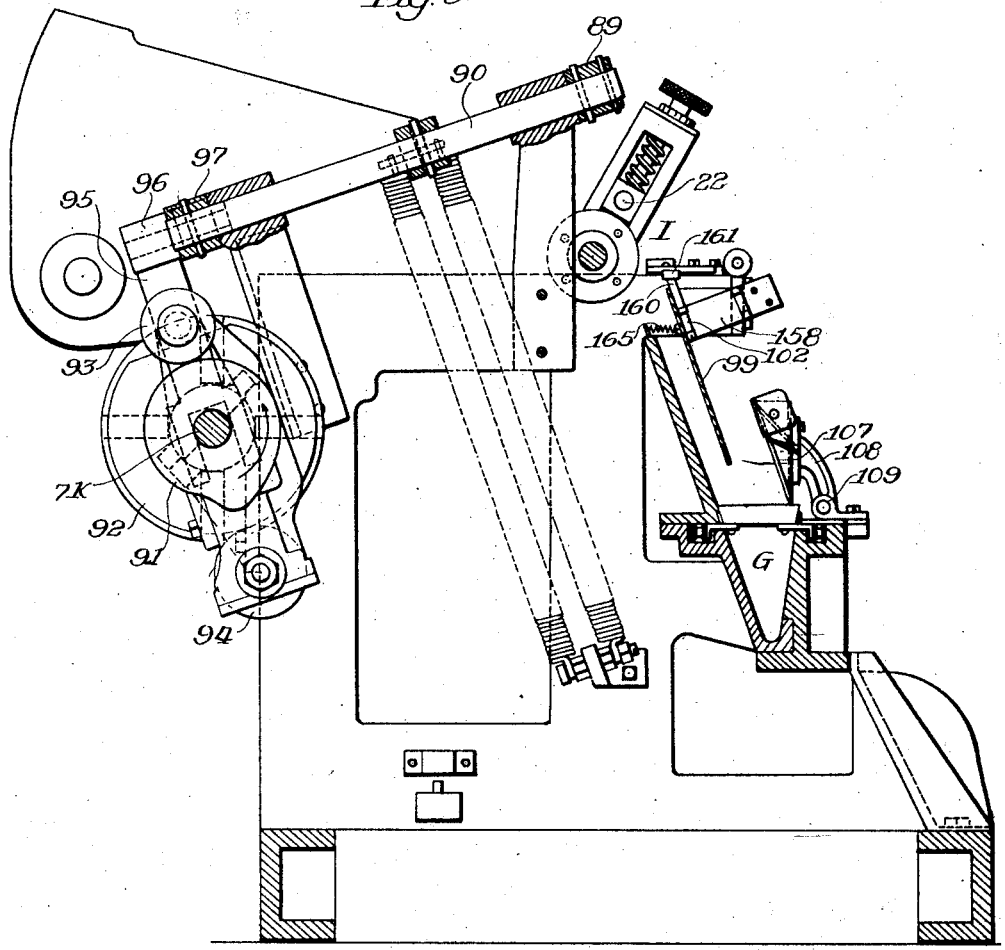
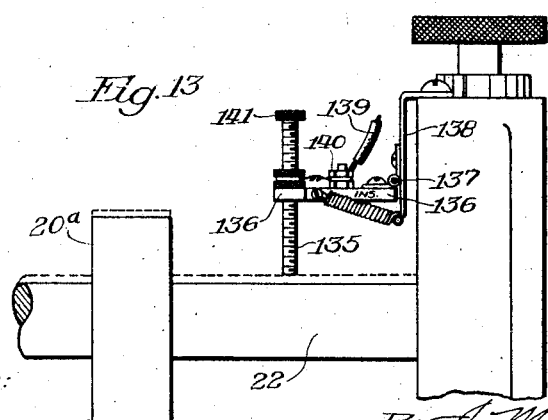

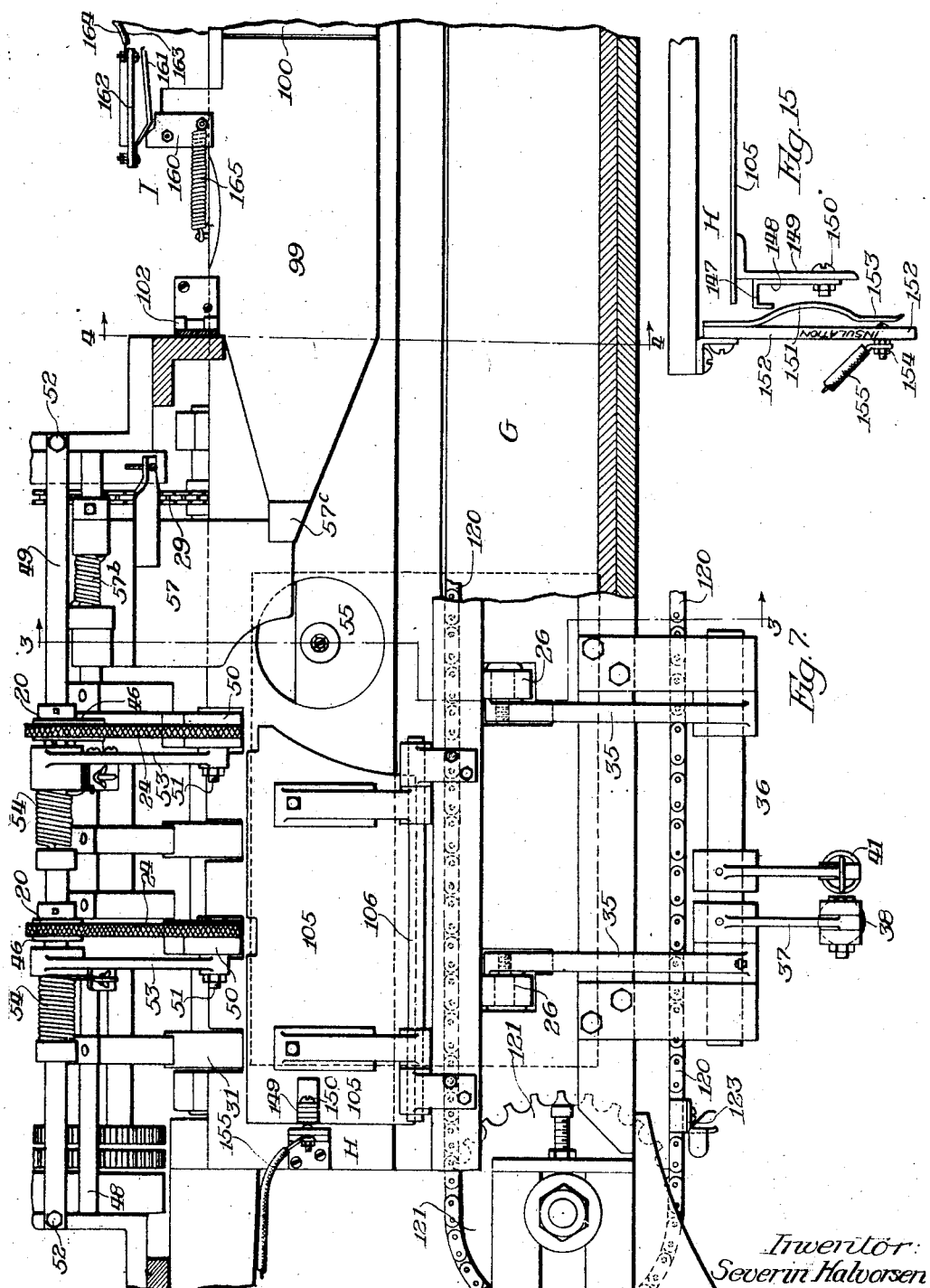

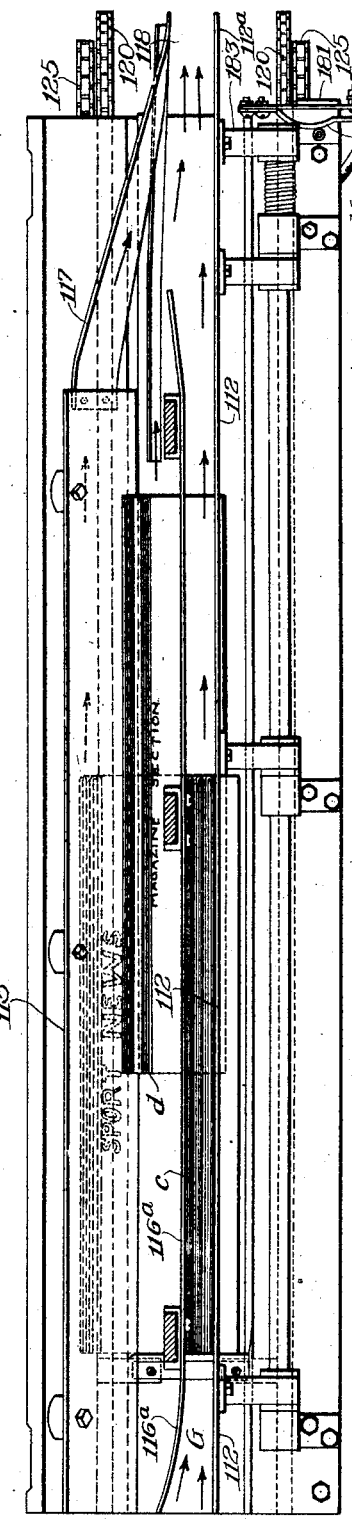

Dec. 31, 1929. S. HALVORSEN 1,741,564
SIGNALING, INDICATING, STOPPING, AND STARTING DEVICE
Original Filed May 20, 1922 12 Sheets-Sheet 9
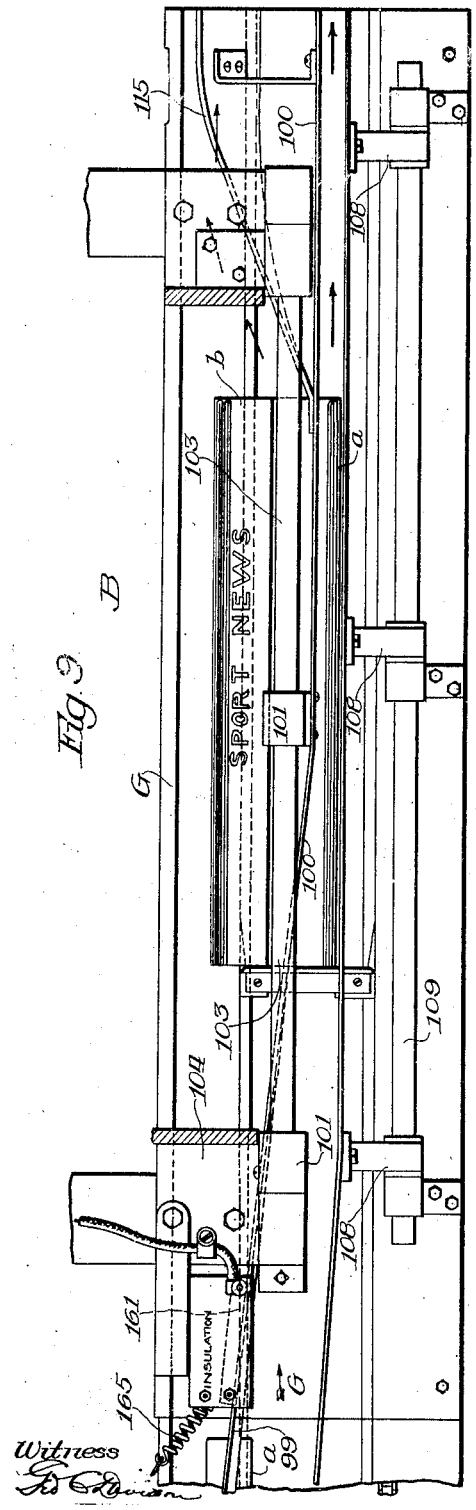
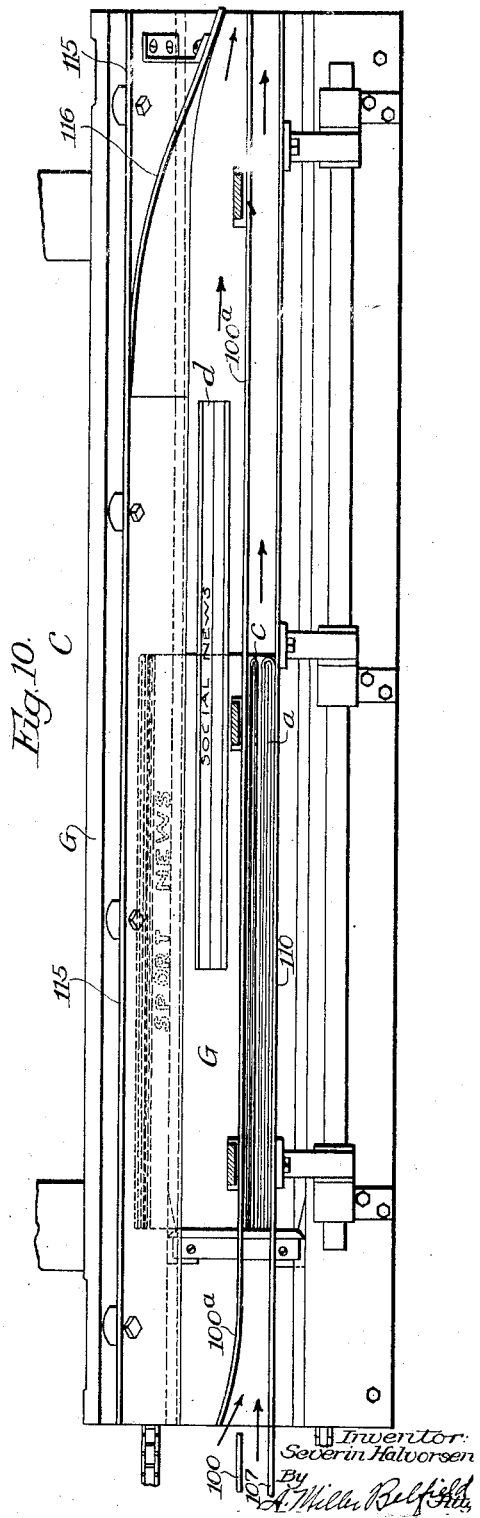

Dec. 31, 1929. S. HALVORSEN 1,741,564
SIGNALING, INDICATING, STOPPING, AND STARTING DEVICE
Original Filed May 20, 1922 12 Sheets-Sheet 10
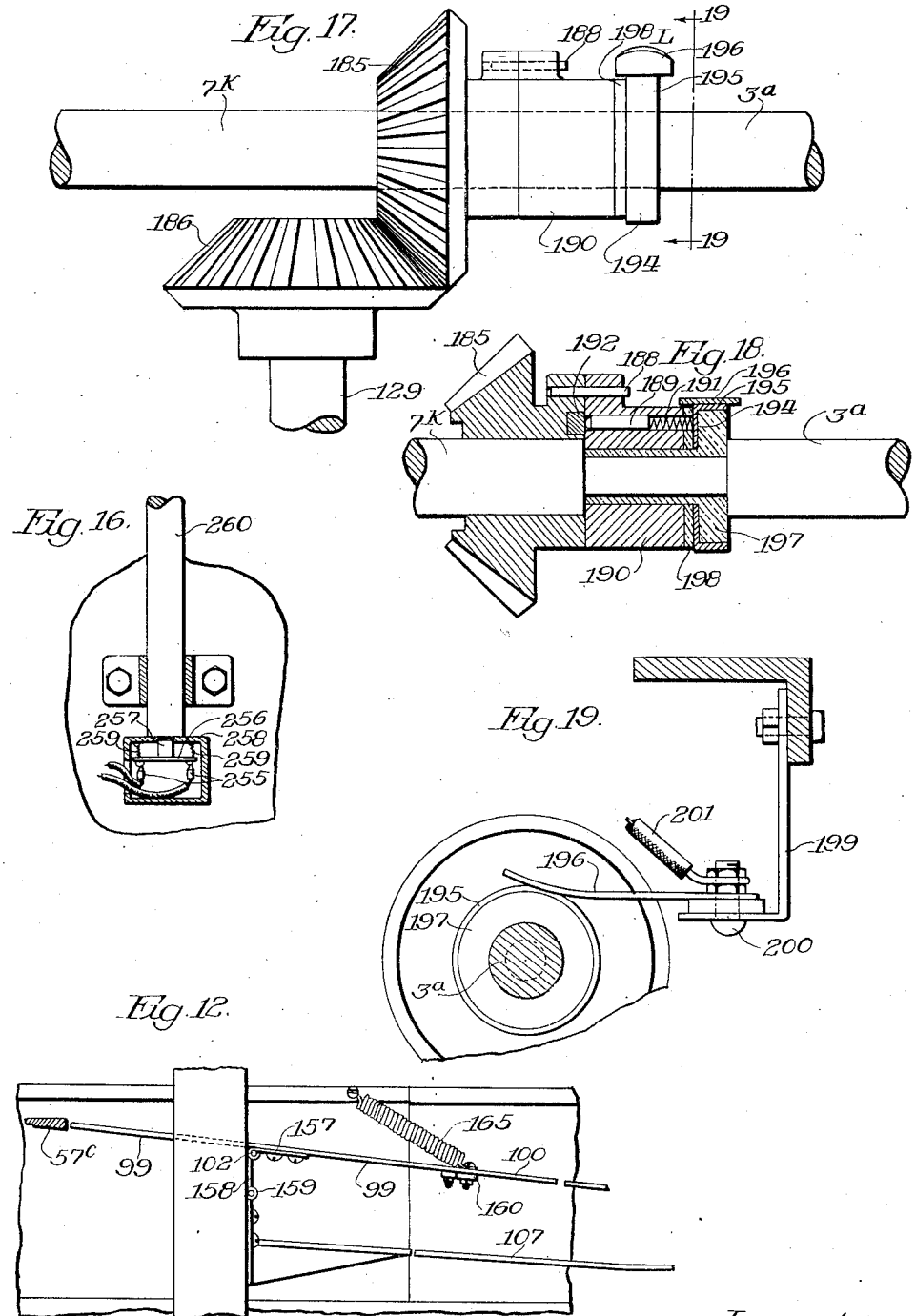

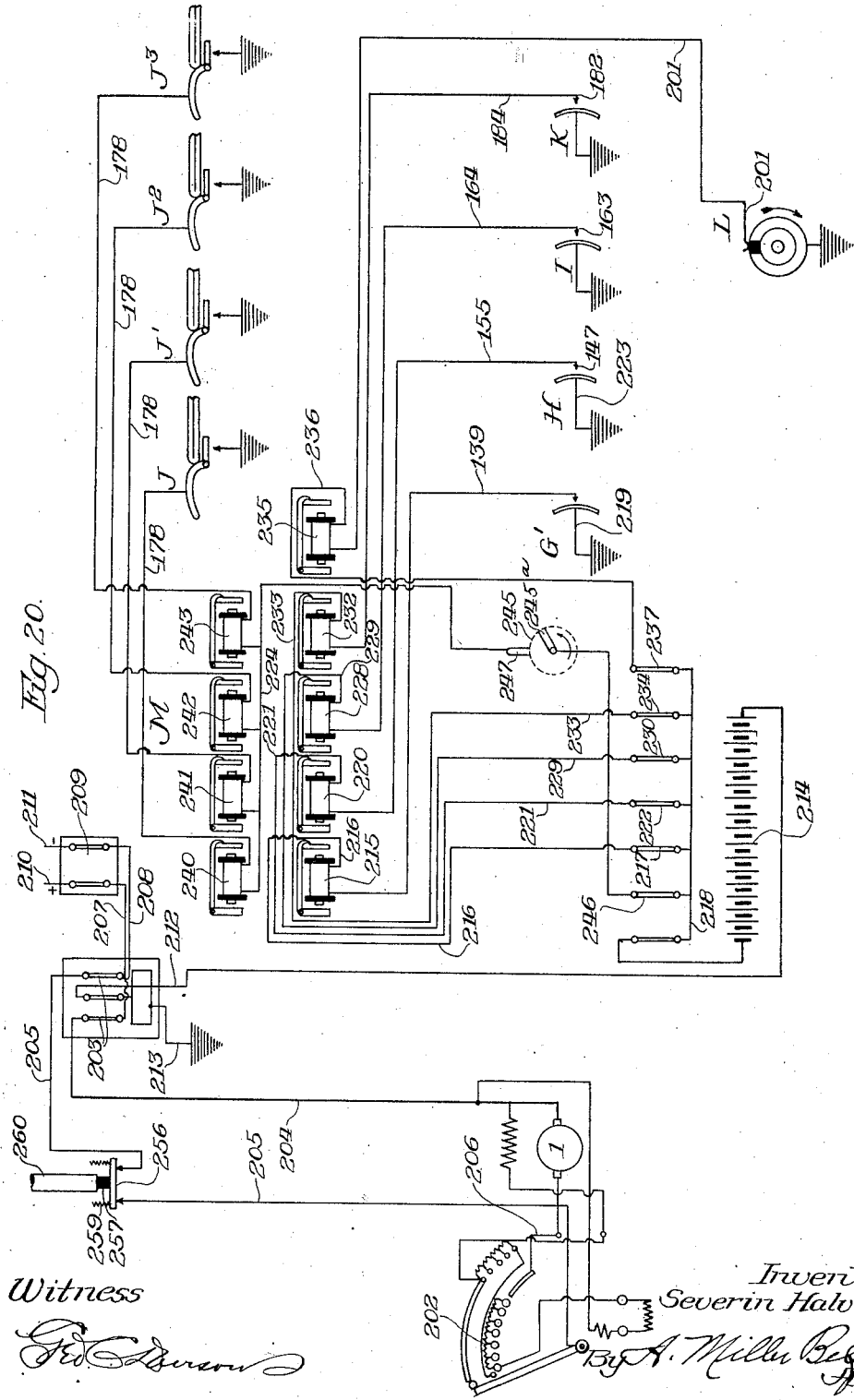

Dec. 31, 1929.  S. HALVORSEN  1,741,564
SIGNALING, INDICATING, STOPPING, AND STARTING DEVICE
Original Filed May 20, 1922  12 Sheets-Sheet 12
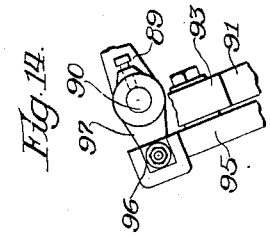
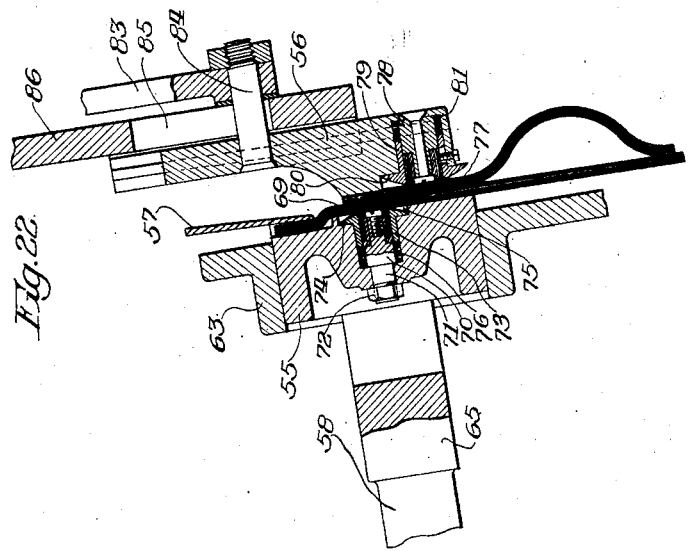
Witness:
Inventor:
Severin Halvorsen.
By H. Miller Belfield
Atty Patented Dec. 31, 1929

1,741,564

UNITED STATES PATENT OFFICE

SEVERIN HALVORSEN, OF CHICAGO, ILLINOIS, ASSIGNOR TO THE NEWSPAPER STUFFING MACHINE COMPANY, OF SEATTLE, WASHINGTON, A CORPORATION OF WASHINGTON

SIGNALING, INDICATING, STOPPING, AND STARTING DEVICE

Original application filed May 20, 1922, Serial No. 562,462. Divided and this application filed September 10, 1923. Serial No. 661,816.

My invention relates to signaling, indicating, stopping and starting devices which are applicable for association with paper feeding machines, etc. as for instance, a machine such as shown and described in my application Serial No. 562,462, filed May 20, 1922, of which the subject matter forming the basis of this application is a division.

It is one of the objects of the invention to provide a machine of the above character with means for preventing the improper starting of the machine.

In addition it is an object to provide signaling or indicating means applicable for co-operation with a machine having a number of feeding devices, said signaling means being operable to indicate the improper operation of either of said devices.

It is a further object of the invention to provide a means which will cause the machine to be brought to a stop when trouble occurs at one of said feeding devices.

It is another object to provide means which will indicate the point of trouble, should a sheet or section be fed to the machine in a crumpled condition.

In addition it is an object to provide the opening heads which act to open the paper sections with means for indicating trouble at these points.

It is a further object to provide means at the delivery end of the machine to indicate trouble occurring at this point and to further provide means for stopping the machine should the structure be subjected to an extraordinary strain and thereby prevent breakage of the parts.

The invention will be explained and more readily understood when read in conjunction with the accompanying drawings which illustrate various devices for accomplishing the above and other objects, it being understood however, that changes and modifications may be resorted to without departing from the spirit of the appended claims forming a part hereof.

In the drawings Fig. 1 is a front elevation of a newspaper stuffing machine embodying my present invention;

Fig. 3 is a section taken on line 3—3 of Fig. 7;

Fig. 4 is a section taken on line 4—4 of Fig. 7;

Fig. 5 is a section taken on line 5—5 of Fig. 1;

Fig. 6 is a section taken on line 6—6 of Fig. 1;

Fig. 7 is a section taken on line 7—7 of Fig. 3;

Fig. 8 is a section taken on line 8—8 of Fig. 1;

Fig. 9 is a plan view of a portion of the machine to the right of Fig. 7;

Fig. 10 is a plan view of a portion of the machine to the right of Fig. 9;

Fig. 11 is a plan view of a portion of the machine to the right of Fig. 10;

Fig. 12 is a plan view of a portion of the trough;

Fig. 13 is a detail view of the mechanism for bringing the machine to a stop when more than one cover sheet is fed to the machine;

Fig. 14 is a side view of certain parts illustrated in Fig. 6;

Fig. 15 is a detail view of a means employed for bringing the machine to a stop when a section is fed thereto in a crumpled condition;

Fig. 16 is a sectional view of a means for preventing the improper starting of the machine;

Figs. 17, 18 and 19 illustrate the means for preventing breakage of parts when an undue strain is applied to the machine;

Fig. 20 is a diagrammatic view of the electrical arrangements for operating the automatic stopping and indicating mechanism.

Figs. 21 and 22 are views illustrating a means for separating the paper sections.

Figure 1:
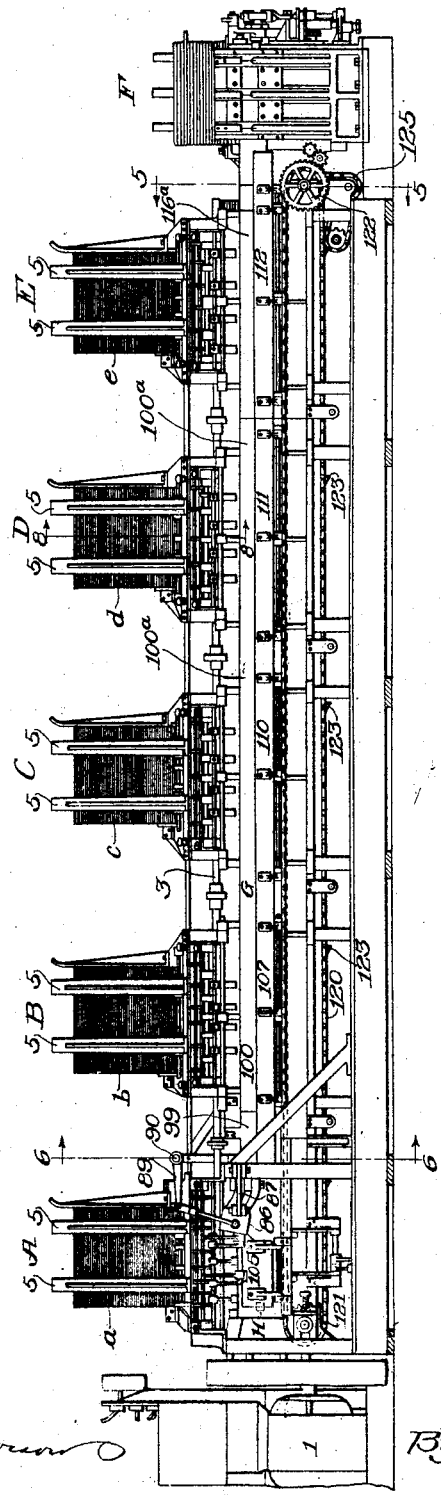

Referring to the drawings, and particularly to Fig. 1, I show a machine of the class specified in which there are five heads or magazines A, B, C, D, and E, each one containing a pile or stack of newspaper sections, which are to be assembled to form complete newspapers. Head or magazine A contains a pile of papers which are to be outside or cover sections of the complete paper. Heads or magazines B, C, D and E contain papers which are to be inserted into the outside or cover section, one from each of said heads B, C, D and E into each outside or cover section. At F is a delivery mechanism by which the complete newspapers are delivered from the machine. As this delivery mechanism forms the subject matter of a separate application for patent executed by me of even date herewith, Serial No. 562,462, filed May 20th, 1922, the same will not be described in detail herein.

Extending along the heads A to E, inclusive, is a support G, which is preferably in the form of a V-shaped trough adapted to receive cover sections from the head A and to support the same in an open condition as they are moved along from head to head to receive insert sections from the heads B to E, inclusive.

At each of the heads A to E, inclusive, there is a feeding mechanism by which paper sections are fed one by one from said heads to the receiving and supporting trough G. At the head A there is an opening mechanism by which the cover sections are opened. Advancing mechanism is provided for moving the open cover sections along the support G to receive the insert sections from heads B-E, inclusive, and to deliver the complete newspapers to delivery mechanism F. Along the support G there are various instrumentalities for holding the cover sections open and also for moving each insert to one side of the open cover section so as to make room for and prevent interference with the next insert section. Other instrumentalities are provided for automatically stopping the machine when there is improper or imperfect operation, as for example, at one of the feed mechanisms. When the machine is automatically stopped in this way the point where the trouble is, is automatically indicated.

Figure 2:
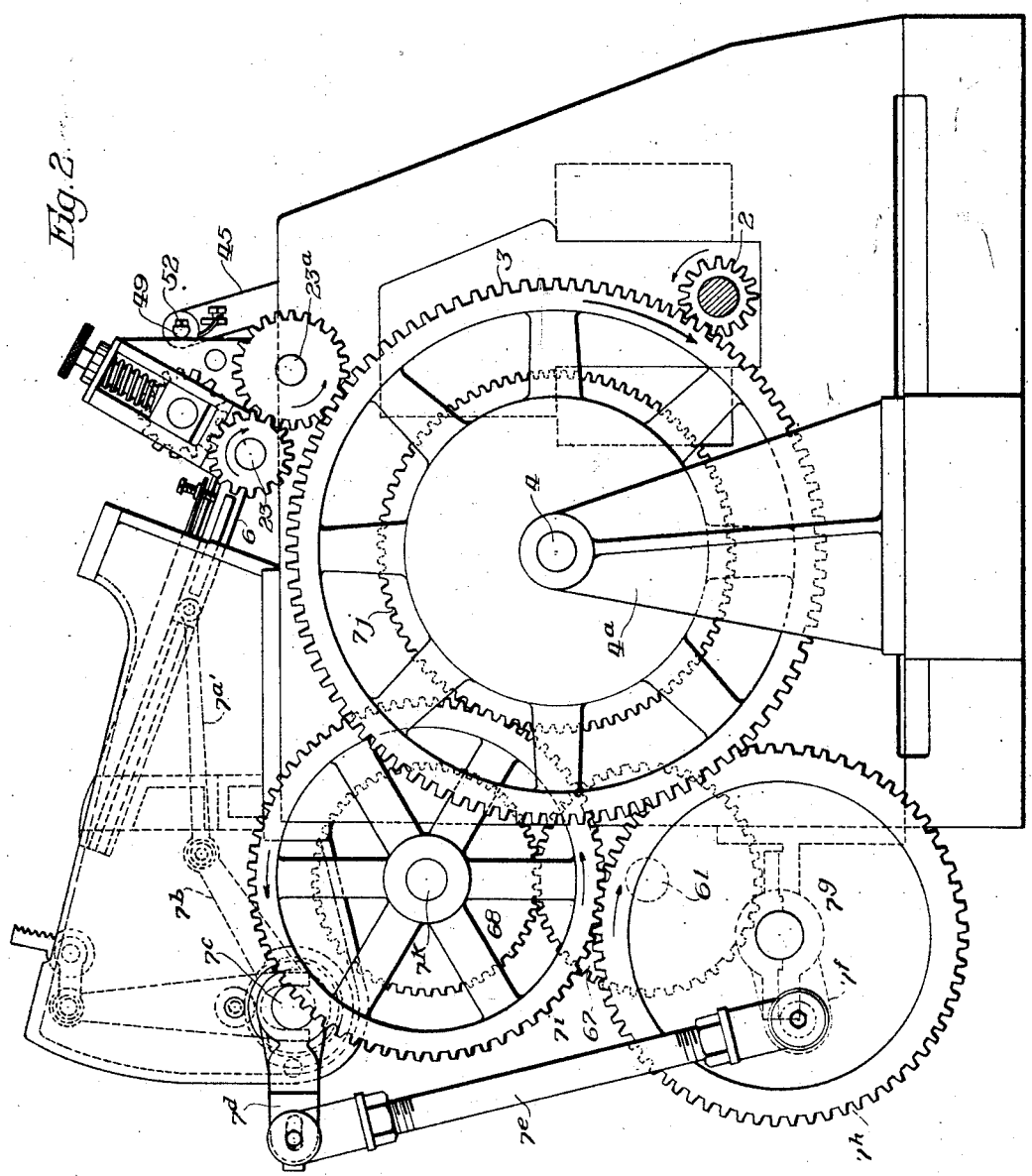
Fig. 2 is an end elevation of the structure shown in Fig. 1, showing the machine employed for driving said structure.

In Fig. 1 I show an electric motor 1 mounted on the floor at the left hand end of the machine for driving the same. This is understood to be suitably connected with some source of electrical energy. This motor is provided with a pinion 2 meshing with a gear 3 on a shaft 4 on a pedestal $4^a$ (Figure 2). Certain driving shafts are run by this gearing, as will be pointed out more fully hereafter.

The mechanism for feeding the cover sections from head A to support G and opening them in said support is shown best in Figs. 1, 2, 3, 4, 5, 7, 8, 9, 10 and 11. In this arrangement the head A is provided with front uprights 5 for holding the front edges of the papers. Strips 6 support the pile of cover sections $a$ arranged in this head A.

The cover sections $a$ are fed from the head A by feeding apparatus adapted to engage the bottom cover section $a$ and push same out of the bottom of head A. This feeding mechanism comprises a series of reciprocating sliding shoes or carriages 7—7 supported by the members 6—6, said shoes 7—7 being provided with means for first engaging a bottom paper section and pulling it backwardly to release its front end, and for then pushing it forwardly to eject it from the head. These paper engaging means comprise pivoted dogs 8—8 and 9—9, one dog 8 and three dogs 9 being associated and connected together to form a set. These dogs 8 and 9 are pivotally connected by pins 10—10 with the shoe 7, and are provided with needles which engage the lowermost paper section. Dogs 9—9 are in front of dog 8. Dogs 8 are for engaging bottom paper section to withdraw or retract same a short distance to release the front end of the paper section from abutment 12. Dogs 9—9 are for engaging a paper section to then move it forward to eject it from head or holder. Shoe 7 has side projections $7^a$ sliding in grooves $6^a$ in members 6, holding shoes 7 in proper position and permitting their back and forth sliding movement. The particular feeding mechanism employed in the device is substantially identical with that shown and described in an application filed by me of even date herewith and will therefore not be explained in detail herein.

The sliding shoes 7—7 are reciprocated by links $7^{a'}$, pivotally connected with swinging arms $7^b$ on a rock shaft $7^c$, which is actuated by an arm $7^d$ pivotally connected with a link $7^e$ which is in turn driven by a crank $7^f$ on shaft $7^g$, driven by gears $7^h$, $7^i$, and $7^j$ from drive shaft 4, gear $7^i$ being on main drive shaft $7^k$. The feed devices for head A, feeding cover sections, are driven by shaft $7^c$ actuated by feed drive shaft $7^g$. The feed devices of the other heads B, C, etc. feeding insert sections, are driven by separate shafts in alinement with shaft $7^c$, but disconnected from same, said shafts being also driven from shaft $7^g$, as by links such as $7^a$, similarly connected and arranged to link $7^b$. These separate shafts are provided because of the need of feeding paper sections from the cover section head A at time different from insert section heads B, C, etc., each cover section being fed prior to the feeding of an insert section, to permit opening of the cover section and movement to an insert head before an insert section is fed to it.

The outward movement of the paper sections from head A is aided by a belt $14^a$ traveling over wheels 15 and 16 mounted on shafts 17 and 18, respectively. The shaft 17 is driven intermittently by a ratchet arrangement consisting of a ratchet wheel on shaft 17, and a swinging arm $17^b$ being actuated by link 19 pivoted to crank arm 20 on shaft $7^c$.

The cover sections after leaving the head

A pass between feed rolls 20ª and 21, the former of which is mounted on shaft 22 and the latter on a drive shaft 23, which is geared to front drive shaft 23ª driven by gear 3 on shaft 4, and extending clear across the front of the machine so as to drive feed rolls 20ª and 21 for all the heads A, B, etc. The cover section being fed upon passing between the feed rolls 20ª and 21 strikes against a baffle or abutment 24 by which it is turned downwardly so as to direct it into the support or trough G, in which as previously explained the assembling of the paper sections takes place.

The cover sections move downwardly to the bottom of the troughs or support G and when they reach the bottom of the same are instantly and automatically engaged so as to prevent them from rebounding upwardly The preferred form of mechanism for this purpose is generally similar to mechanism for the same purpose disclosed and claimed in my pending application Serial No. 406,578, filed April 28, 1920, newspaper stuffing machine. The mechanism shown comprises cooperating rollers 25 and 26, arranged near the bottom of the trough G and adapted to engage the sides of the cover sheet when the same comes in position between them. The roller 25 is driven by sprocket chain 27 which is in turn driven by shaft 28, which latter is driven by sprocket chain 29 running over sprocket wheel 30 on rotary shaft 23. Another feed roll 31 is arranged below the feed roll 21 and driven by a sprocket wheel 32 meshing with the chain 29, the roll 31 further assisting the cover section in its downward movement into the trough G. An idle sprocket 33 is arranged above the shaft 28 and mounted for adjustment to take up the slack in said chain 29. The roll 26 which cooperates with the driven roll 25 is mounted for swinging movement toward and away from the roll 25, as for example, by mounting said roll 26 on a swinging arm 35 pivoted at 36 and having a lever arm 37 which is pivotally connected with a reciprocating link 38. The link or rod 38 is reciprocated by a cam 39 engaging a roller 40 on said rod 38, the cam 39 driving the rod 38 positively in a forward manner so as to swing the roll 26 toward the roll 25 and a spring 41 being employed to swing or retract the arm 35 in the opposite direction. The movements of the rod 38 and arm 35 are so timed that the roll 26 is separated from the roll 25 when the cover sheet is descending into the trough G, but is moved into close proximity to roll 25 as the cover sheet approaches the bottom of the trough, so that when the lower edge of the cover sheet has nearly or quite reached the bottom of the trough, the rolls 25 and 26 are sufficiently close together to firmly grip and hold it, the movement of roll 25 being downward adjacent the cover section, so as to press same downwardly.

Further feeding devices, preferably in the form of feeding tapes 24, are arranged to assist in feeding the cover sheets a into and down the trough. These tapes are extended over one side of the feed roll 20ª and also over idle rolls 46 and 47 on shafts 48 and 49, respectively, and also extended downwardly and around feed rolls 50 on a shaft 51. The shaft 49 is secured to the framework of the machine by bolts 52, (Fig. 7), and the shafts 51 carrying rolls 50 are carried by arms 53 pivotally mounted on shaft 49. This permits rolls 50 to be swung upwardly by swinging arms 53, which arms however, are normally held downwardly by springs 54 on shaft 49. As rolls 50 are opposite rolls 31, said rolls 50 are normally pressed toward rolls 31, and thereby normally pressed against the cover sheet and consequently assist in moving the same downwardly.

When the cover section is in the trough G it is opened so that the insert sections may be inserted. Various forms of opening mechanisms could be employed but as a preferred arrangement I employ an opening mechanism having the general features of construction and operation of the opening mechanism illustrated and described in my aforesaid application Serial No. 920,184. By this mechanism the outer or far side of the cover section is buckled or crumpled downwardly, and then allowed to rise and upon rising passes on the outer side of an opening blade which thus occupies a place between the two sides of the cover section. The sides are then spread or separated by the action of this inserted blade and by further opening or separating mechanism.

This opening mechanism is shown in Figs. 3, 4, 21 and 22. It comprises oppositely disposed heads 55 and 56, the former adapted to engage the inner side of the cover section and hold it in position and the latter adapted to engage the outer side of the same and push it down so as to buckle or crumple said outer side and then pull it up to original position, as a result of which operation an opening blade or insert member 57 will be located in position between the inner and outer sides of said cover section. The head 55 is carried by a reciprocating member 58 which latter is reciprocated by a cam 60 on a driving shaft 61, said cam 60 cooperating with a roller 62 on the reciprocating member 58. A bearing 63 is provided for head 55 and another bearing 64 for enlargement 65 on the member 58. The member 58 is jointed at 58ª and has a rear section or extension 58ᵇ connected with the section 58 by sleeve 58ᶜ which encloses spring 58ᵈ. Bolts 66 regulate the distance between members 58 and 58ᵇ. Shaft 61 is driven by main drive shaft $7^k$ by means of gears 67 and 68.

The head 55 is provided with a device for engaging the adjacent ply of a cover section, said device comprising pins 69 set in a block-like member 70 (Figs. 21 and 22), which latter is provided with a threaded bolt 71 engaged by a nut 72 to hold said member 70 in position in the head 55. A collar 73 surrounds the outer end of the member 70 and fits loosely over the same so that it may be slid back and forth to cover and uncover the ends of the pins 69. Said collar 73 has a flange 74 adapted to fit in a recess 75, so that when pressed inwardly the flange 74 will fit into recesses 75, whereas when in an outward position the flange 74 cover said pins, as shown in Fig. 21. A spring 76 is arranged in a recess surrounding the member 70 and acts against collar 73, tending to push the same normally in an outward direction. Thus as the head 55 is reciprocated, the flange 74 will be pushed against the adjacent fold of the cover section and will be slipped back on the member 70 so as to expose the pins 69 and thereby cause the latter to penetrate the cover section fold, as shown in Fig. 22. The other head 56 is also provided with paper engaging pins 77 on a member 78 which latter is surrounded by a collar 79 having a flange 80, said collar being subject to a spring 81 tending to push the collar 79 normally out.

This head 56 is carried by mechanism by which it may be reciprocated in a more or less vertical manner so that after it has engaged the outer fold of the cover section, that is the fold nearest the head 56, said head may push said fold downwardly and buckle the same, as shown in Fig. 22. To such end said head 56 is carried by a reciprocating rod 83, by means of a connecting pin 84. The pin 84 slides in a slot 85 in a plate 86, which latter is mounted on an arm 87 pivoted at 88 so that the plate 86 and with it the head 56 may be swung in and out to bring the head 56 into cooperative relation with the head 55, and also to separate the head 56 from the head 55 by a substantial distance to permit access to the trough or support G at this point. The reciprocating rod 83 is connected at its upper end to a pivoted lever 89 pivoted on a shaft 90 (Fig. 6), which shaft 90 is rocked by suitable cam action so as to give the head 56 the necessary up and down reciprocation. Such cam arrangement comprises cams 91 and 92 on main drive shaft $7^k$, (Fig. 6). Cam 91 cooperates with roll 93 and cam 92 cooperates with roll 94. These rolls 93 and 94 are carried by a rod or arm 95 having a pivotal connection 96 with a short rotary arm 97 on the shaft 90. Thus the reciprocation of the arm 95 in one direction and the other by cams 91 and 92 acting on rolls 93 and 94, respectively, causes a rocking of shaft 90 and the consequent swinging of arm 83 and reciprocation of head 56 to buckle the outer ply of cover section.

The outer ply or fold of the cover section being thus buckled, the head 56 thereupon moves upwardly and when so moved its upper end will pass outside of the plate 57, whereby the two plies are separated with the plate 57 between them. Plate 57 is mounted so that it hangs in a substantially vertical position, as shown in Fig. 3, its lower end being loose and its upper end being suspended upon a shaft 48 so that said plate may be swung into a substantially horizontal position if desired. A spring $57^b$ normally holds the plate in vertical position.

The cover section being thus permanently opened, it is further opened by means of a nose or supplemental opening member 99 arranged in position in the trough G and located so that its end fits against the end or projection $57^c$ of the insert member 57 (Fig. 7). This member 99 is adapted to further spread or separate and open the cover section as it is moved along the trough, said member 99 extending lengthwise of the supporting trough G, but being inclined toward the front of the machine, as shown in Fig. 9, whereby the front or outer fold of the cover section will be moved or swung outwardly or forwardly as it moves lengthwise of the trough. Another member 100 forms a continuation of the nose member 99 and is similarly inclined, said member 100 extending well toward the forward side of the trough where it is secured upon a supporting member 101 (Fig. 5). The nose member 99 and the extension member 100 are preferably adapted to be swung out of the way so that access may be had to the interior of the trough if desired. To such end the nose member 99 is hinged at 102 (Fig. 7), so that it can swing crosswise of the trough. Also the member 100 is mounted so that it can swing by mounting the supporting arm 101 on a pivotal shaft 103 (Fig. 5), the latter being supported on a bracket 104 on the machine frame. Preferably the front wall of the trough G is made so that it can swing in sections forwardly so as to open or partially open the trough. To such end the outer section 105 of the trough (Fig. 4) is mounted on a shaft 106 so that it can be swung backward and forward. Also the front wall section 107 is mounted so that it can be swung forwardly as by mounting it on bracket 108 supported on pivotal shaft 109, Fig. 5. Also other front wall trough sections 110, 111, and 112, (Fig. 1), are mounted for forward swinging opening motion in the same manner as section 107, as will be referred to more fully hereinafter.

Referring again now to the opening of the cover section by the members 99 and 100 and the movement of said section along the trough G, said movement occurs continually so as to bring said section in front of heads B, C, D and E in succession. When opposite head B another section of the paper which will be called the first insert section *b*, is inserted from said head B.

The insertion of such an insert *b* will be accomplished by feeding mechanism such as previously described in connection with head A. Such an insertion is shown in Fig. 5, the outer or cover section *a* being shown at the bottom of the supporting trough G, and the first insert section *b* arranged in the open cover section *a*.

As a preferred arrangement the first insert *b* is shifted to the inner side of the trough after it has been deposited therein, so that said first insert will be well at the inner side of the cover section when the latter is advanced sufficiently along the trough to come opposite the third head C. This permits another insert to be readily introduced into the outer or cover section without any interference with the first insert *b*.

For this purpose, I show in Figs. 10 and 11 a longitudinally extending guide or plate member 115 which inclines or extends inwardly toward the inner side of the trough G so as to move the first insert in that direction. At a point opposite the head C the first insert *b* is well in toward the inner edge of the trough so that a second insert *c* may readily be deposited in the interior of the outer section *a*. Such an insert *c* is shown being deposited in the trough in Fig. 5. This insert *c*, it will be understood, is fed down from the head C at an appropriate time when the cover section *a* containing the first insert *b* has been moved opposite or substantially opposite to said head.

It is also preferably arranged that this second insert *c* may be shifted to the other or outer side of the trough G to permit the ready introduction of a third insert *d* from head D. To such end guide or plate member 116 extends along trough G and inclines forwardly or outwardly as shown at right of Fig. 10. Insert *c* strikes this and is rushed forwardly. This permits a third insert *d* from head D to be fed down. This will occur just as described for insert *c*, the trough section in front of head D being constructed just as trough section in front of head C, whereby insert *d* is fed into cover section *a* in the same place as *c* is shown in said Fig. 10, insert *c* at such time being between guide member 100ª and wall section 111 (similar to 110), having been pushed there by guide member 116 in trough in front of head C.

The insert *d* is pushed to the front by guide member 116 in the trough section in front of head D, (Fig. 10), so that insert *d* comes into position between 116ª (Fig. 11), and front wall section 112, thereby making room for insertion of the final insert *e* from head E. Such an insert is made as shown in Fig. 5.

Thus the cover section *a* will contain the four inserts, *b*, *c*, *d* and *e*, whereof the first insert *b* is at the inner side of the cover section, and the other inserts *c*, *d* and *e* are at the front or outer side of the cover section.

The cover section containing these four inserts is now closed, preparatory to delivery to the delivery mechanism of the machine. To such end another guide member 117 (Figs. 5 and 11) is provided, the same having its left hand end (Fig. 11) secured to the inner wall of the trough and being then extended or inclined forwardly. Thus the inner fold or ply of the cover section *a* will strike against the member 117 and with the first insert *b* will be pushed forwardly toward the other or front cover section and the three inserts *c*, *d* and *e*. The guide member 116ª terminates before the member 117 terminates, thereby providing a relatively small space 118 between the end of member 117 and the end of front wall section 112. The complete paper, the cover section with all the inserts, is thus closed at said space 118 and then delivered to the delivery mechanism, which will be referred to more fully hereinafter.

In connection with the trough and guides therein, it may be noted that as a preferred arrangement the front wall sections 107, 110, 111 and 112 are as a preferred arrangement located respectively in front of the heads B, C, D and E, the joints being preferably about midway between the successive heads, and as previously pointed out these front wall sections are independently adjustable to permit any one or more of them to be swung forwardly so as to gain access to the interior of the trough. Also the various guide members such as 100, 100ª, 116 and 116ª, are mounted on arms 101 supported by a shaft 103 so that they may be independently swung forwardly and upwardly to permit access to the interior of the trough. Thus any one of the several trough sections may be either partially opened by the forward or outward swinging of the corresponding wall section, or may be fully opened by swinging such wall section and also swinging the corresponding guide member. This permits ready access to either the front of the trough or the front and rear of the same at any desired point.

For advancing the cover section and inserts along the trough, I show a pair of chains 120 arranged on opposite sides of the trough as shown in Fig. 5, and mounted on sprocket wheels 121 and 122 at the opposite ends of the machine. These chains are provided with inwardly extending projections or fingers 123 located at intervals and adapted to engage the rear edges of the cover sections and push the same along the trough. These sprocket wheels 122 are driven by sprocket chains 125 through the medium of a drive shaft 126 connected by sprocket and chain with shaft 126ª, which is connected by mitre gears 127 and 128 with another drive shaft 129 which is in turn gear connected with the main drive shaft 7$^k$. The sprocket chains 120 advance continuously at such a speed as to move the cover sections forwardly to receive the various inserts and finally deliver the whole to the delivery mechanism.

Certain provisions are made for automatically stopping the machine in case there is improper operation in certain respects. For example, provision is made to automatically stop the machine if there is improper feeding from the first head so that two papers instead of one are fed from the same. This arrangement is shown in Figs. 3 and 13. The drive roller 20$^a$ is mounted so that it may have a certain amount of vertical adjustment, and when a paper goes through between rollers 20$^a$ and 21, 20$^a$ moves up a determined distance. A screw 135 is mounted above shaft 22 so that when the latter is raised higher than the determined distance it will contact with the lower end of screw 135. Screw 135 is mounted in a block or strip of insulation 136, preferably pivoted at 137 on a bracket 138, whereby screw 135 may be elevated slightly by an extent of movement on the part of the shaft 22 greater than is necessary merely to contact with end of screw 135. A conductor 139 runs to binding post 140 on insulation strip 136, and thence to another binding post 140$^a$ which also serves as a lock nut for screw 135 to hold the latter in adjustment, said screw 135 being provided with a knurled head 141 permitting it to be turned so as to adjust it in insulation strip or support 136. Conductor 139 runs to certain switching or annunciator mechanism as will be explained more fully hereafter. Suffice it here to say that undue elevation of roller 20$^a$ causes contact of the shaft 22 with screw 135, thereby closing electrical circuit through ground of the machine to conductor 138 running to switching and annunciator mechanism as will be described hereafter. This mechanism automatically opens the motor circuit and thereby stops the machine from running and the annunciator mechanism indicates the point where the trouble is so that it may be at once found when the machine is stopped. Two or more papers passing out of the first stack A will cause this elevation of shaft 22 and roller 20$^a$, and thereby cause this electrical stoppage and indication. To prevent breakage and allow plenty of play on the part of shaft 22, screw 135 is pivotally or otherwise adjustably mounted as described. To permit adjustment of the machine to different sized paper sections in stack A, screw 135 may be turned so that its end will be raised or lowered to permit more or less play on the part of roll 20$^a$ before contact is made with the end of said screw 135. This point of trouble is, as noted, at the first stack A, which may be called for convenience trouble point G.

Another automatic stoppage of the machine and indication of point of trouble takes place when a paper from the first stack A feeds into the trough in a crumpled condition, so that it will not feed properly to the opening mechanism. This arrangement is best shown in Figs. 7 and 15. The swinging panel or trough wall member 105 is provided with a contact 147 conveniently formed by the outer end of a bracket 148 secured to bracket 149 on said wall member 105 by screw 150. A spring 151 on insulated end piece 152 is in position to be made contact with by contact 147 when wall member 105 is swung outwardly and this would take place when a paper in a crumpled or thickened condition was fed into the trough. When contact is made between 147 and 151 the end 153 of spring 151 makes contact with screw 154 secured to but insulated from end piece 152, thereby closing the circuit between the machine or ground and contact 154 to which is connected wire 155 running to the aforesaid switching and annunciator mechanism, as will be presently described. This closure of the circuit between contacts 153 and 154 will automatically stop the machine and indicate where the trouble occurs, that is at this beginning end of the trough which we will call trouble point H.

Provision is made for stopping the machine when trouble occurs at the opening head, where the cover section is open to receive the insert sections. This is best shown in Figs. 6, 7 and 12. In this arrangement the opening member 99 is mounted for longitudinal movement in the trough when a cover section jams or is not properly opened. As a simple arrangement said member 99 is mounted upon a bracket member 157 which is pivoted at 102, Fig. 12, to another bracket member 158 which is in turn pivoted at 159. Thus the forward movement of the jammed or thickened paper section, or an improper opening of the same will move the member 99 lengthwise of the trough and this movement will cause an upright 160 (Fig. 6) on said member 99 to strike against a contact 161 arranged below and secured to an insulation strip 162. Actuation of the contact 161 will cause the same to strike against a contact screw 163 to which a conductor 164 is connected. Spring 165 tends to hold the member 99 in normal position but to allow the same to move by the jamming of an improperly operating paper section. The actuation of contact strip 161 so as to make contact with 163 will cause closing of circuit through conductor 164 to the switching and annunciator mechanism, automatically stop the machine and also indicate the point where this trouble occurs which we will call trouble point I, opener mechanism trouble.

Another provision for stopping the machine in case of trouble is in case of improper feed at the stacks B, C, and E. In case there is improper action at any one of these stacks, so that no paper section is fed from any one of the same, stoppage of the machine and indication of trouble takes place. The mechanism shown for this purpose is best shown in Fig. 8, and comprises a swinging arm member 168 having a finger 169 which is arranged underneath a paper section in process of passing through feed rolls $20^a$ and 21. The member 168 is pivoted at $169^a$ and provided with a bracket member 170 to which a swinging arm or link 171 is pivotally connected at 172. Spring 173 is connected to arm 171 tending normally to hold said arm 171 and also bracket 170 in a downward position, thereby tending to force finger 169 upwardly against the feeding paper section. A bracket 174 of insulating material serves as a pivotal support for arm 171 and a contact 175 is arranged in position to be struck by end of arm 171 if said arm is pulled down sufficiently by spring 173. Contact 175 is held in position by insulating block or strip 177, member 174 being also made of insulating material. Conductor 178 is connected with contact 175. Thus when a paper section as $d$, (Fig. 8), is being fed between rolls $20^a$ and 21, member 168 will be held down by said paper section so that arm 171 will not touch contact 175. When, however, no paper section is above upper end of finger 169, said finger is free to rise in response to action of spring 173 and arm 171 will make contact with contact 175, thus closing the circuit through the machine and conductor 178. This conductor runs to the switching and annunciator mechanism previously referred to which will cause the automatic stoppage of the machine and the indication of the present trouble. There are four mechanisms of the kind just referred to for automatically stopping the machine, said mechanisms being located at the stacks B, C, D and E, each one as well as stopping the machine will indicate where the trouble is. These trouble points will be called J, J', $J^2$, and $J^3$.

Provision is made for stopping the machine automatically in case of trouble at the delivery end, where delivery of the papers is made to the delivery mechanism F, Fig. 11.

This arrangement comprises a contact strip 180 on an end bracket 181, and a contact screw 182 adapted to be contacted with by the end of strip 180. This contact will take place when trough wall section 112 is swung outwardly by a jammed or crumpled paper in the trough, and when so swung bracket 183 supporting wall section 112 will strike against the bow-shaped metal portion of strip 180 and swing the same so as to cause the end of said strip to strike contact screw 182. This will close circuit to conductor 184 connected with screw 182 and cause the stoppage of the machine as will be described hereinafter, and the automatic indication of the point of trouble which will be called trouble point K, delivery end of the trough.

There is one further arrangement for automatically stopping the machine, and this is in case there is some interference with the machine bringing a heavy strain on the main driving shaft so that unless relieved the shaft itself or some gear connected with it might be broken. This arrangement permits the main body of the drive shaft 3 to be in effect separated from the motor and the electrical connection to be made to stop the motor when such separation is made.

This arrangement is best shown in Figs. 17, 18 and 19. In this arrangement the drive shaft $7^k$ is jointed, as shown in Fig. 18, the main body part which is connected with the motor carrying a gear 185 in mesh with another gear 186 on shaft 129 which latter extends down through bevel gears 128 and 127 which drive the chains 120 for advancing the cover section and inserts along the trough. The supplemental bar or extension $3^a$ of the drive shaft $7^k$ is connected with the main part $7^k$ by a pin 188 which is strong enough to impart movement from $7^k$ to $3^a$ ordinarily, but is weak enough to break in case an excessive strain is put on $3^a$. In case of breakage of pin 188 of course shaft $7^k$ will turn relatively to $3^a$. Electrical connection is provided to automatically stop the motor and indicate the place of trouble, which in this instance will be called trouble point L, main drive shaft.

As a convenient form of electrical connection, I show a pin 189 in a slot in a head 190 on shaft $3^a$, said pin 189 being subject to spring 191 tending to push it out of said slot or recess. Gear hub 185 is provided with a block or piece 192 of insulating material against which pin 189 normally presses. During normal conditions no connection is made with 189 because of the latter being of insulation, but when pin 188 breaks and permits $3^a$ to turn relatively to $7^k$, piece 192 will move away from end of pin 189, thereby permitting the latter to come into contact with bar of metal of gear 185, thereby establishing electrical connection. This connection extends through spring 191 to metal plate 194 having an annular surface 195 on which commutator the brush 196 rests. Thus connection made with pin 189 is communicated through spring 191, plate 195 and brush 196 to the automatic switching and annunciator apparatus which will be presently described. Plate 194 is fitted on sleeve member 197 which is made of insulation so as to insulate plate 194 and an insulating disk 198 is fitted adjacent plate 194 to insulate the other side of same, whereby pin 189 and connections are properly insulated from the machine. Brush 196 is mounted on bracket 199 by means of screw 200 and conductor 201 is connected to binding screw 200 and let thence to the switch and annunciator apparatus previously referred to.

Referring now to the arrangement by which these various electrical circuit controlling mechanisms control the operation of the machine, reference is made to Fig. 20. In this figure I show the electric driving motor 1 diagrammatically and show it connected with a rheostat 202 by which its resistance and speed are controlled and varied. There is also shown an automatic cut-out switch 203, one side of which is connected by wire 204 with a motor and the other side of which is connected by wire 205 with the rheostat 202, which in turn is connected by wire 206 with the other side of the motor. From automatic switch 203 wires 207 and 208 run to a main switch 209 which is in turn connected by wires 210 and 211 with the outside circuit for supplying energy to the motor 1.

The automatic switch 203 is understood to be normally closed but automatically operable to open the motor circuit 204-205 on passage of current through said switch 203, for which purpose a main wire 212 is shown running to one side of the switch mechanism and a ground wire 213 running to the other side of the same. Wire 212 runs to a main battery 214 having ample power to operate switch 203. In place of battery 214 of course some other source of electrical energy could be used.

The various circuit controlling devices previously referred to are connected with the automatic switch 203 so that each one will open the same and thereby stop the driving motor 1, when trouble occurs. Also annunciator mechanism M is present to indicate the place of trouble. Considering first trouble point G, the feeding of two or more cover sections from stack A, conductor 139 running to contact screw 135 is connected to annunciator magnet 215, whence conductor 216 runs to fuse 217 and thence to battery lead 218 and battery 214 and thence to automatic switch 203 and thence to ground by conductor 213, the circuit being completed through ground and to the other side of the machine 219, so that connection is made through annunciator magnet 215 and automatic cut-out switch 203, thereby actuating said annunciator magnet and indicating that there is trouble at point G and also automatically opening the motor circuit and stopping the motor. The trouble may be located at G and remedied and automatic switch again closed and the operation of the machine resumed.

In a similar manner circuit control mechanism at point H, the left hand or cover section receiving end of the trough, has its conductor 155 running to contact 147 connected to annunciator magnet 220, whence connection is made by conductor 221 to fuse 222, and thence to battery 214, automatic cut-out switch 203 and ground, the other side of the circuit at the machine being indicated at 223. In a similar manner trouble at this point will be indicated by annunciator magnet 220 and the motor circuit switch automatically opened to stop the machine. The trouble being located and remedied the machine is again started.

Similarly the circuit controlling mechanism at trouble point I has its conductor 164 running from contact 163 connected with annunciator magnet 228, whence circuit wire 229 runs to fuse 230 and thence to battery 24 and automatic switch 203 as in the case of other connections. Similarly the mechanism at point K, the delivery end of the trough, has its conductor 184 running from contact 182 connected with annunciator magnet 232 which latter is connected by conductor 233 with fuse 234, whence connection is made through battery to automatic cut-out switch and to ground as in other circuits. Also circuit connection at point L, the main drive shaft connection, has its conductor 201 connected with annunciator magnet 235 and thence by conductor 236 to fuse 237, and thence to battery cut-out switch and ground as in other arrangements. The four circuit closing arrangements at the stacks B, C, D and E, namely at points J, J', J$^2$, and J$^3$, have their conductors 178 connected respectively with eccentric magnets 240, 241, 242 and 243, and thence by conductor 244 through timer 245 and fuse 246, to battery and automatic cut-out 203 and ground. Timer 245 is included in circuit with these devices in order that the circuit may be closed through these circuit connections only when paper sections are being fed from their respective stacks D, C, etc. At other times the circuits are open, so that there will be no operation in these mechanisms when no paper sections are normally passing out of said stacks. To such end this timer 245 comprises a rotary contact 245$^a$ adapted to make contact with a stationary contact 247, the period of contact being the period when paper sections are passing out of said stacks.

In Fig. 16 is shown an arrangement for preventing improper starting of the machine. This comprises a switch having contacts 255 and having a projection or pin 257 passing through switch box 258 and controlled by springs 259 tending to push projection 257 out of box. When bar 260 is down, projection 257 is depressed, contacting 255 with 256 and closing circuit, permitting the machine to run. When bar 260 is withdrawn, circuit is opened, thereby preventing machine from running. Bar 260 is used to turn machine by hand, being inserted in apertures in a wheel not shown on the driving shaft to give leverage to turn the shaft and move the machine little by little for inspection purposes. If bar 260 were left in an aperture in said wheel and the machine were accidentally started, bar 260 might fly out and do damage. Hence it is necessary for said bar to be withdrawn from said wheel and inserted in socket in Fig. 16 before the machine can be started.

It will be understood that changes and modifications may be made without departing from the spirit of the invention.

What I claim is:

1. The combination with a stack for cover sections, of means for feeding sections one by one from said stack and means for automatically stopping the machine when said feeding mechanism feeds more than one cover section, said means comprising an adjustable roller adapted to be actuated by more than one paper section, means for closing an electrical circuit when said roller is actuated comprising an adjustable screw, an insulating support carrying said screw, a circuit conductor connected with said screw and means for controlling the operation of the machine controlled by the circuit including said screw.

2. The combination with a stack for cover sections, of means for feeding sections one by one from said stack and means for automatically stopping the machine when said feeding mechanism feeds more than one cover section, said means comprising an adjustable roller adapted to be actuated by more than one paper section, means for closing an electrical circuit when said roller is actuated comprising an adjustable screw, an insulating support carrying said screw, a circuit conductor connected with said screw and means for controlling the operation of the machine controlled by the circuit including said screw, said insulating support being mounted for adjustment.

3. The combination with electrical circuit devices controlled by abnormal conditions of a paper section and an automatic switch controlling the motor circuit and adapted to be operated by the actuation of said electrical connections, and annunciator mechanism for locating the position of the abnormal conditions.

4. In a machine of the character described, the combination of means for feeding sheets from a stack and means for automatically stopping said feeding means, said last mentioned means including a feeding element and an electrical contact making element operable by the feeding element, said feeding element being movable into engagement with said contact making element.

5. In a machine of the character described, the combination of means for feeding sheets one by one from a stack and means for stopping said feeding means when a sheet is fed in a defective condition, said means including a feed member arranged in the path of the sheet and mounted for bodily movement out of the path of the sheet and having a contact making element operable to stop the machine upon the movement of said member.

6. In a machine of the character described, the combination of means for feeding sheets one by one in a folded condition from a stack, means for opening the fold of the sheet and means for stopping said machine upon the occurrence of trouble at either one of said fold opening means.

7. In a machine of the character described, the combination of means for feeding sheets one by one in a folded condition from a stack, means for opening the fold of the sheet and means for stopping said machine upon the occurrence of trouble at either one of said fold opening means, said means for stopping the machine being operable by said first mentioned means.

In witness whereof, I hereunto subscribe my name this 7th day of August, A. D. 1923.

SEVERIN HALVORSEN.